(12) United States Patent
Iwamoto et al.

(10) Patent No.: US 12,128,393 B2
(45) Date of Patent: Oct. 29, 2024

(54) DENITRATION CATALYST REGENERATION METHOD AND DENITRATION CATALYST REGENERATION SYSTEM

(71) Applicant: Mitsubishi Power, Ltd., Yokohama (JP)

(72) Inventors: Kazuhiro Iwamoto, Tokyo (JP); Masanao Yonemura, Tokyo (JP); Katsumi Nochi, Tokyo (JP); Yoshiharu Watanabe, Kanagawa (JP); Masanori Demoto, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 627 days.

(21) Appl. No.: 17/441,358

(22) PCT Filed: Nov. 19, 2019

(86) PCT No.: PCT/JP2019/045293
§ 371 (c)(1),
(2) Date: Sep. 21, 2021

(87) PCT Pub. No.: WO2020/194851
PCT Pub. Date: Oct. 1, 2020

(65) Prior Publication Data
US 2022/0152603 A1    May 19, 2022

(30) Foreign Application Priority Data
Mar. 28, 2019 (JP) ................. 2019-063522

(51) Int. Cl.
*B01J 38/60* (2006.01)
*B01J 38/52* (2006.01)
(Continued)

(52) U.S. Cl.
CPC ........... *B01J 38/60* (2013.01); *B01J 38/52* (2013.01); *B01J 38/54* (2013.01); *B01J 38/62* (2013.01)

(58) Field of Classification Search
CPC ... B01J 38/60; B01J 38/52; B01J 38/54; B01J 38/62
(Continued)

(56) References Cited

U.S. PATENT DOCUMENTS

| 6,025,292 A | 2/2000 | Obayashi et al. |
| 11,491,476 B2 * | 11/2022 | Shen .................... B01J 38/48 |

(Continued)

FOREIGN PATENT DOCUMENTS

| CN | 110072621 A * | 7/2019 | ......... B01D 53/8621 |
| JP | H10-235209 A | 9/1998 | |

(Continued)

OTHER PUBLICATIONS

Office Action dated Mar. 24, 2023, issued in counterpart KR Application No. 10-2021-7029971, with English translation. (16 pages).

(Continued)

*Primary Examiner* — Patricia L. Hailey
(74) *Attorney, Agent, or Firm* — WHDA, LLP

(57) ABSTRACT

Provided are a denitration catalyst regeneration method and a denitration catalyst regeneration system, which are capable of recovering denitration performance to a high level and reducing the $SO_2$ oxidation rate of a catalyst. A denitration catalyst regeneration method according to the present invention includes: a chemical solution cleaning step for immersing a denitration catalyst in a chemical solution containing a fluorine compound and an inorganic acid; a step for extracting the denitration catalyst from the chemical solution; and a finish washing step for washing the denitration (Continued)

catalyst extracted from the chemical solution with a finish cleaning solution containing an organic acid.

30 Claims, 3 Drawing Sheets

(51) Int. Cl.
*B01J 38/54* (2006.01)
*B01J 38/62* (2006.01)

(58) Field of Classification Search
USPC .................. 502/27, 28; 423/213.2, 239.1
See application file for complete search history.

(56) References Cited

U.S. PATENT DOCUMENTS

| | | | |
|---|---|---|---|
| 2006/0148639 A1* | 7/2006 | Foerster | B01J 38/62 502/27 |
| 2011/0172083 A1* | 7/2011 | Schluttig | B01D 53/96 502/5 |
| 2018/0185834 A1 | 7/2018 | Masuda et al. | |

FOREIGN PATENT DOCUMENTS

| | | |
|---|---|---|
| JP | 3377715 B2 | 2/2003 |
| JP | 2011-031237 A | 2/2011 |
| JP | 2012-024669 A | 2/2012 |
| JP | 4870217 B2 | 2/2012 |
| JP | 6298579 B2 | 3/2018 |
| KR | 20180017103 A | 2/2018 |
| KR | 20180076389 A | 7/2018 |
| WO | 2017/010402 A1 | 1/2017 |
| WO | 2019/004123 A1 | 1/2019 |

OTHER PUBLICATIONS

International Search Report dated Feb. 10, 2020, issued in counterpart International application No. PCT/JP2019/045293, with English translation. (5 pages).

Written Opinion dated Feb. 10, 2020, issued in counterpart International application No. PCT/JP2019/045293, with English translation. (10 pages).

* cited by examiner

DENITRATION CATALYST REGENERATION METHOD AND DENITRATION CATALYST REGENERATION SYSTEM

TECHNICAL FIELD

The present invention relates to a denitration catalyst regeneration method and a denitration catalyst regeneration system, and particularly, to a regeneration method and a regeneration system for a deteriorated denitration catalyst for a coal-fired boiler. Priority is claimed on Japanese Patent Application No. 2019-063522, filed Mar. 28, 2019, the content of which is incorporated herein by reference.

BACKGROUND ART

Facilities which combust fuels such as fossil fuels or biomass include a denitration facility which removes nitrogen oxides contained in an exhaust gas generated by combusting the fuel. The denitration facility includes a denitration catalyst which promotes the removal of nitrogen oxides. The denitration catalyst deteriorates in performance as it is used. Therefore, in the denitration facility including the denitration catalyst, the denitration catalyst is replaced or added during maintenance. Furthermore, a regeneration treatment for recovering the catalyst performance is performed in order to reuse the denitration catalyst.

As the regeneration treatment, washing a catalyst with reduced denitration performance by using a washing liquid containing a hydrofluoric acid at a concentration of 0.3 to 3 mass % and having a temperature maintained at 40° C. to 80° C. has been known (PTL 1). In addition, a method including: previously water-washing a denitration catalyst with the activity reduced by a poisoning substance of a silica, alumina, or calcium sulfate type; washing the catalyst using a mixed liquid of an organic acid and a fluoride at room temperature; rinsing the catalyst with water or a dilute organic acid; and further rinsing the catalyst with an aqueous solution containing a catalyst component has been known (PTL 2).

CITATION LIST

Patent Literature

[PTL 1] Japanese Unexamined Patent Application Publication No. 10-235209
[PTL 2] Japanese Unexamined Patent Application Publication No. 2011-31237

SUMMARY OF INVENTION

The denitration performance of the catalyst can be recovered to some extent by the regeneration treatments described in the above literatures. However, although the denitration performance of the catalyst can be recovered by these regeneration treatments, there is a problem that the $SO_2$ oxidation rate of the catalyst increased as the catalyst is used remains high according to the catalyst.

In view of the above circumstances, an object of the present invention is to provide a denitration catalyst regeneration method and a denitration catalyst regeneration system which are capable of recovering denitration performance of a catalyst to a high level and reducing an $SO_2$ oxidation rate of the catalyst.

In order to achieve the above object, in one aspect of the present invention, a denitration catalyst regeneration method includes: a chemical washing step of immersing a denitration catalyst in a chemical containing a fluorine compound and an inorganic acid; a step of taking the denitration catalyst out of the chemical; and a finish washing step of washing the denitration catalyst taken out of the chemical with a finish washing liquid containing an organic acid.

In one aspect of the present invention, a denitration catalyst regeneration method includes: a chemical washing step of immersing a denitration catalyst in a chemical containing a fluorine compound and a first organic acid; a step of taking the denitration catalyst out of the chemical; and a finish washing step of washing the denitration catalyst taken out of the chemical with a finish washing liquid containing a first inorganic acid.

In one aspect of the present invention, a denitration catalyst regeneration system includes: a chemical washing portion which immerses a denitration catalyst in a chemical containing a fluorine compound and an inorganic acid; and a finish washing portion which subjects the denitration catalyst taken out of the chemical to finish washing with a finish washing liquid containing an organic acid.

In one aspect of the present invention, a denitration catalyst regeneration system includes: a chemical washing portion which immerses a denitration catalyst in a chemical containing a fluorine compound and a first organic acid; and a finish washing portion which subjects the denitration catalyst taken out of the chemical to finish washing with a finish washing liquid containing a first inorganic acid.

According to the present invention, provided are a denitration catalyst regeneration method and a denitration catalyst regeneration system which are capable of recovering denitration performance of a catalyst to a high level and reducing an $SO_2$ oxidation rate of the catalyst.

DESCRIPTION OF EMBODIMENTS

Hereinafter, preferable embodiments will be described in detail with reference to the accompanying drawings. The present invention is not limited to the embodiments. In a case where there are a plurality of embodiments, the present invention also includes combinations of the embodiments and embodiments in which a part of each embodiment is substituted.

1. First Embodiment

1.1. Regeneration System

Figure 1:
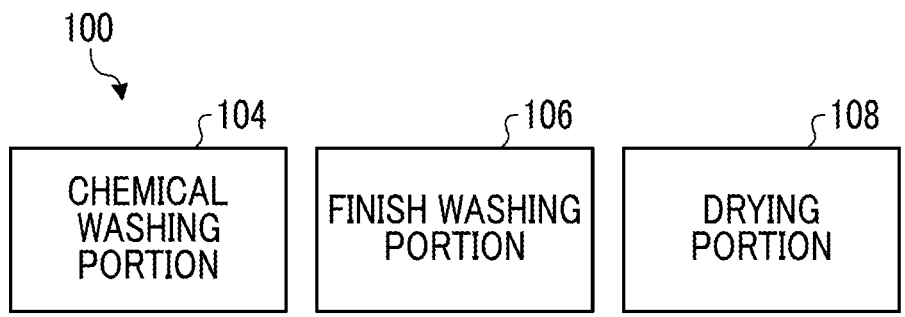
FIG. 1 is a schematic diagram showing a schematic configuration of a denitration catalyst regeneration system according to first to third embodiments.

FIG. 1 shows a schematic configuration of a denitration catalyst regeneration system according to a first embodiment. As shown in FIG. 1, a denitration catalyst regeneration system 100 includes at least a chemical washing portion 104, a finish washing portion 106, and a drying portion 108, and is configured to execute a regeneration treatment for recovering the catalyst performance of a denitration catalyst according to the configuration.

The denitration catalyst to be regenerated is, for example, a used denitration catalyst (hereinafter, also referred to as a used denitration catalyst) with reduced catalyst performance, poisoned by being used for denitration of an exhaust gas containing poisoning substances such as silicon (Si) such as silica ($SiO_2$), aluminum (Al), calcium (Ca), phosphorus (P), arsenic (As), sodium (Na), and potassium (K) generated from a coal-fired boiler. The denitration catalyst has a form such as a lattice-like (honeycomb-like) form, a plate-like form, and a corrugated form, and for example, has at least one active component selected from the group consisting of vanadium (V), tungsten (W), and molybdenum (Mo) supported on a carrier such as a titanium dioxide ($TiO_2$).

The chemical washing portion 104 includes at least a chemical washing tank for washing the denitration catalyst with a chemical and a supply mechanism which supplies the chemical into the chemical washing tank. The chemical tank is, for example, a container which is larger than the denitration catalyst and can store a liquid. The chemical washing portion 104 is configured to immerse the used denitration catalyst taken out of the denitration facility in the chemical of the supply mechanism in the chemical washing tank so as to remove substances such as silica ($SiO_2$) adhering to the denitration catalyst. The chemical washing portion 104 may have a configuration in which the denitration catalyst is put into a water tank storing a chemical to immerse the chemical in the denitration catalyst, or a configuration in which a chemical is applied to the denitration catalyst in the chemical washing tank using a shower nozzle or the like to wash the denitration catalyst.

The finish washing portion 106 includes at least a finish washing tank for washing the denitration catalyst with a finish washing liquid (hereinafter, also referred to as a washing liquid) and a supply mechanism which supplies the washing liquid into the chemical washing tank. The finish washing tank is, for example, a container which is larger than the denitration catalyst and can store a liquid. The finish washing portion 106 is configured to perform the finish washing of the denitration catalyst in the finish washing tank with the washing liquid of the supply mechanism so as to remove or reduce the chemical adhering to the denitration catalyst. The finish washing portion 106 may have a configuration in which the denitration catalyst is put into a water tank storing a finish washing liquid to immerse the washing liquid in the denitration catalyst, or a configuration in which a washing liquid is applied to the denitration catalyst in the finish washing tank using a shower nozzle or the like to wash the denitration catalyst. In addition, the finish washing portion 106 may further include a finish water washing portion for further water-washing the denitration catalyst subjected to the finish washing to remove the chemical.

The drying portion 108 is configured to dry the denitration catalyst by removing the moisture from the denitration catalyst subjected to the finish washing. The drying portion 108 has at least a heating mechanism, and can be configured to pass a gas heated to 100° C. or higher such as a gas at 130° C. through the denitration catalyst so as to remove the moisture adhering to the denitration catalyst. The drying portion 108 may be a portion capable of removing the moisture from the denitration catalyst, and may have a configuration in which the moisture is blown off from the denitration catalyst by applying dried air to the denitration catalyst, or a configuration in which the moisture is evaporated from the denitration catalyst in a space heated to 100° C. or higher.

The denitration catalyst regeneration system 100 according to the present embodiment can optionally further include a pre-washing portion (not shown). In this case, the pre-washing portion includes at least a water tank for water-washing the denitration catalyst and a water supply mechanism which supplies the water into the water tank. The water tank is, for example, a container which is larger than the denitration catalyst and can store a liquid. The pre-washing portion is configured to wash the denitration catalyst taken out of the denitration facility with the water from the water supply mechanism in the water tank so as to remove foreign substances, ashes, and poisoning substances such as soluble calcium adhering to the surface and inside of the denitration catalyst. The pre-washing portion may have a configuration in which the denitration catalyst is put into the water tank storing water to immerse the denitration catalyst in the water, or a configuration in which water is applied to the denitration catalyst in the water tank using a shower nozzle or the like to wash the denitration catalyst. In the pre-washing portion, at least foreign substances adhering to the denitration catalyst may be removed, and a liquid in which water and a component for washing the denitration catalyst are mixed may be used.

The pre-washing portion can optionally further include a vacuuming tank and a jet water washing tank (not shown). The vacuuming tank has at least a water tank for washing the denitration catalyst, a lid, and a suction mechanism such as a vacuum pump, and is configured so that the denitration catalyst after the pre-washing is put into the water tank storing water to immerse the denitration catalyst in the water and a vacuum state is prepared by sucking the air while the inside of the tank is in a sealed state. The jet water washing tank includes at least a water tank for washing the denitration catalyst and a water supply device, and is configured to spray high-pressure water assisted by compressed air so as to supply the water to the inside of the denitration catalyst. In the present disclosure, the inside is determined by the form of the denitration catalyst and includes gas vents through which an exhaust gas flows. By the treatment, foreign substances mainly clogging the inside of the denitration catalyst can be further removed.

1.2. Regeneration Method

Figure 2:
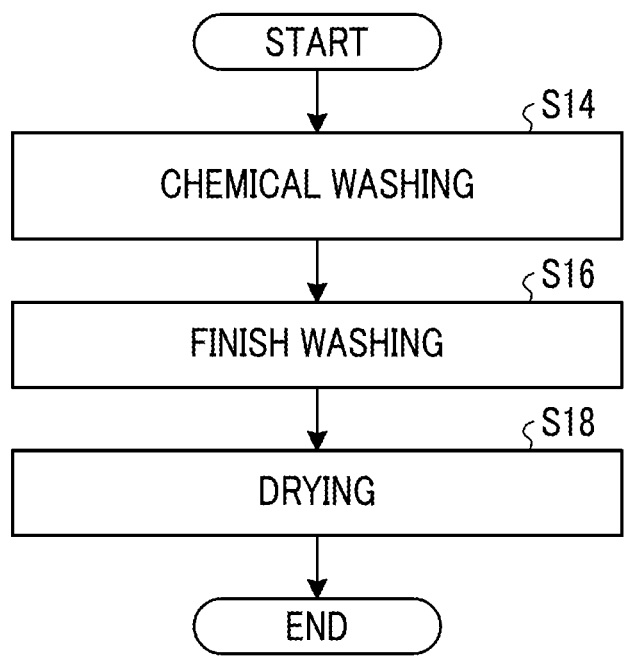
FIG. 2 is a flowchart showing an example of a denitration catalyst regeneration method according to the first to third embodiments.

FIG. 2 shows a flowchart showing an example of a denitration catalyst regeneration method according to the first embodiment. The denitration catalyst regeneration method shown in FIG. 2 can be realized by executing the treatment in each portion of the denitration catalyst regeneration system 100 shown in FIG. 1. The denitration catalyst regeneration method according to the present embodiment includes at least a chemical washing step, a step of taking out the denitration catalyst, and a finish washing step.

As shown in FIG. 2, in the chemical washing step (Step S14), a chemical is used to immerse the used denitration catalyst taken out of the denitration facility in the chemical washing portion 104 filled with the chemical. The chemical washing treatment may be executed by putting the denitration catalyst into the chemical washing portion 104 in which a chemical is previously stored, or by applying a chemical to the denitration catalyst in the chemical washing portion 104. The treatment time may be, for example, in a range of 15 to 60 minutes, and the chemical temperature may be, for example, in a range of 1° C. to 40° C. The denitration catalyst is taken out of the chemical after the chemical washing treatment. By performing the chemical washing, the elution of an active component such as vanadium from the denitration catalyst is suppressed, and substances such as silica ($SiO_2$) adhering to the denitration catalyst are removed. Furthermore, by performing the chemical washing, a liquid such as a finish washing liquid is easily in contact with the surface of the denitration catalyst, the liquid easily permeates into the denitration catalyst, and the $SO_2$ oxidation rate of the denitration catalyst is reduced.

In the present embodiment, the chemical contains at least a fluorine compound and an inorganic acid. Examples of the fluorine compound include ammonium hydrogen fluoride ($NH_4HF_2$) and ammonium fluoride ($NH_4F$). As the fluorine compound, ammonium hydrogen fluoride is preferable. The amount of the ammonium hydrogen fluoride may be, for example, in a range of 1 to 10 mass %, and is preferably in a range of 1 to 5 mass % with respect to the entire chemical.

Examples of the inorganic acid include a sulfamic acid ($H_3NSO_3$), a hydrochloric acid (HCl), a sulfuric acid ($H_2SO_4$), and a boric acid ($H_3BO_3$). As the inorganic acid, a hydrochloric acid is preferable. Otherwise, a hydrochloric acid and a boric acid are preferable. The boric acid can also function as a rust inhibitor. The amount of the boric acid may be, for example, in a range of 0.001 to 10 mass % with respect to the chemical. As the inorganic acid, a sulfamic acid is also preferable. The amount of the inorganic acid is preferably added so that the pH value of the chemical is in a range of pH 1 to 6, and more preferably in a range of pH 1 to 3. As long as the pH value of the chemical is within the above range, a component other than the inorganic acids can be added.

The chemical preferably contains a surfactant. More preferably, the chemical is a mixed liquid of an inorganic acid, a fluorine compound, and a surfactant. As the surfactant, a nonionic or anionic surfactant is preferable. As the surfactant of the chemical, a nonionic surfactant or an anionic surfactant is preferable. As the nonionic surfactant, a non-phosphate-based surfactant mainly containing a polyoxyethylene polyoxypropylene glycol, a polyoxyethylene derivative, or a polyalkylene glycol derivative is preferable. The ethylene oxide (EO) content of the polyoxyethylene polyoxypropylene glycol may be, for example, 39 mass %. Examples of the non-phosphate-based surfactant mainly containing a polyoxyethylene polyoxypropylene glycol include BLAUNON P-101M (manufactured by AOKI OIL INDUSTRIAL CO., LTD.), EMULGEN PP-220 (manufactured by KAO CORPORATION), NEWPOL PE-61, NEWPOL PE-62, NEWPOL PE-64, NEWPOL PE-68, NEWPOL PE-71, NEWPOL PE-74, NEWPOL PE-75, NEWPOL PE-78, and NEWPOL PE-108 (manufactured by SANYO CHEMICAL INDUSTRIES, LTD.), EPAN 410, EPAN 420, EPAN 450, EPAN 485, EPAN 680, EPAN 710, EPAN 720, EPAN 740, EPAN 750, EPAN 785, EPAN U-103, EPAN U-105, and EPAN U-108 (manufactured by DAIICHI KOGYO CO., LTD.), PRONON (registered trademark) #056, PRONON #101P, PRONON #105, PRONON #124, PRONON #124P, PRONON #154, PRONON #188P, PRONON #201, PRONON #202, PRONON #204, PRONON #208, PRONON #235, PRONON #235P, PRONON #237P, PRONON #238, PRONON #407P, UNILUBE (registered trademark) 70DP-950B, and UNILUBE 75DE-2620R (manufactured by NOF CORPORATION), and PRISTOL EM-440, PRISTOL EM-640, and PRISTOL RM-183 (manufactured by MIYOSHI OIL & FAT CO., LTD.). Examples of the non-phosphate-based surfactant mainly containing a polyalkylene glycol derivative include MASTERAIR 404 (manufactured by BASF SE), FOAMKILLER M-14 (manufactured by AOKI OIL INDUSTRIAL CO., LTD.), DISPANOL WI-115 (manufactured by NOF CORPORATION), UNILUBE 50 MB-2, UNILUBE 50 MB-5, UNILUBE 50 MB-11, UNILUBE 50 MB-26, UNILUBE 50 MB-72, UNILUBE 60 MB-2B, UNILUBE 60 MB-16, UNILUBE 60 MB-26, UNILUBE 75DE-15, UNILUBE 75DE-25, UNILUBE 75DE-60, UNILUBE 75DE-170, UNILUBE 75DE-2620, UNILUBE 75DE-3800, UNILUBE 80DE-40U, UNISAFE AX-22, UNILUBE MB-7, UNILUBE MB-19, UNILUBE MB-700, UNILUBE MB-7X, UNILUBE MB-11X, and UNILUBE 10MS-250 KB (manufactured by NOF CORPORATION), TRIMIN DF-300 and TRIMIN 610 (manufactured by MIYOSHI OIL & FAT CO., LTD.), and RIKEI RK-95 (manufactured by RIKEI CHEMICAL INDUSTRY CO., LTD.). As the anionic surfactant, a phosphoric acid ester-based surfactant mainly containing a phosphoric acid ester such as a polyoxyalkylene alkyl ether phosphoric acid ester or a salt thereof is preferable. As the phosphoric acid ester-based surfactant, a surfactant mainly containing a phosphoric acid ester such as a polyoxyethylene alkyl ether phosphoric acid ester is preferable, and a surfactant mainly containing polyoxyethylene alkyl (C8) ether phosphoric acid ester-monoethanolamine salt is more preferable. Examples of the phosphoric acid ester-based surfactant mainly containing a phosphoric acid ester or a salt thereof include ANTOX EHD-PNA, NEWCOL 100-FCP, and ANTOX EHD-400 (manufactured by NIPPON NYUKAZAI CO., LTD.), and PLYSURF A208F, PLYSURF A208N, PLYSURF A210D, and PLYSURF M208F (manufactured by DAIICHI KOGYO CO., LTD.). The amount of the surfactant may be, for example, 0.001 to 10 mass % with respect to the entire chemical.

In the finish washing step (Step S16), the denitration catalyst is subjected to the finish washing in the finish washing portion 106 using a finish washing liquid. The finish washing treatment may be executed by immersing the denitration catalyst in the finish washing portion 106 in which a washing liquid is previously stored, or by applying a washing liquid to the denitration catalyst in the finish washing portion 106. The treatment time may be, for example, in a range of 15 to 60 minutes, and the washing liquid temperature may be, for example, in a range of 1° C. to 40° C. Due to the finish washing, the chemical adhering to the denitration catalyst is removed or reduced, and the $SO_2$ oxidation rate of the denitration catalyst is reduced.

In the present embodiment, the finish washing liquid contains at least an organic acid. Examples of the organic acid include water ($H_2O$), an oxalic acid ($C_2H_2O_4$), and a mixed liquid thereof. The organic acid preferably contains at least an oxalic acid. As the finish washing liquid, a mixed liquid of water and one or more types of organic acids (hereinafter, also referred to as organic acid-containing water) is preferable, and a mixed liquid of water and an oxalic acid (hereinafter, also referred to as oxalic acid-containing water) is more preferable. The amount of the organic acid may be, for example, in a range of 1 to 10 wt % with respect to the water.

In the drying step (Step S18), the denitration catalyst is moved to the drying portion 108 to remove the moisture from the denitration catalyst, and thus the denitration catalyst is dried. In this step, the moisture adhering to the denitration catalyst is removed by passing a gas heated to 100° C. or higher such as a gas at 130° C. through the denitration catalyst. The drying method may be a method capable of removing the moisture from the denitration catalyst. The moisture may be blown off from the denitration catalyst by applying dried air to the denitration catalyst, or may be evaporated from the denitration catalyst in a space heated to 100° C. or higher.

The denitration catalyst regeneration method according to the present embodiment can optionally further include a pre-washing treatment. In this case, in the pre-washing treatment, the used denitration catalyst taken out of the denitration facility is water-washed in the pre-washing portion before the chemical washing step. The treatment time may be, for example, in a range of 3 to 30 minutes, and the water temperature may be, for example, in a range of 1° C. to 40° C. The pre-washing treatment may be executed by putting and immersing the denitration catalyst in the pre-washing portion in which water is previously stored, or by applying water to the denitration catalyst in the pre-washing portion. By pre-washing the denitration catalyst, foreign substances, ashes, and poisoning substances such as soluble calcium adhering to the surface and inside of the denitration catalyst are removed, a liquid such as a chemical or a finish washing liquid is easily in contact with the surface of the denitration catalyst, and the liquid easily permeates into the denitration catalyst.

The pre-washing treatment can optionally further include a vacuuming water washing treatment and a jet water washing treatment. The vacuuming water washing treatment can be executed by, for example, sucking the air inside the tank while the denitration catalyst after the pre-washing treatment is immersed in the water in the vacuuming tank. The jet water washing treatment can be executed by, for example, spraying high-pressure water assisted by compressed air.

According to the present embodiment, regarding the used denitration catalyst with reduced denitration performance and an increased $SO_2$ oxidation rate, the denitration performance can be recovered, and the $SO_2$ oxidation rate can be significantly reduced. As a result, in treating an exhaust gas in the plant, the amount of ammonium sulfate $((NH_4)_2SO_4)$ derived from $SO_2$ in the exhaust gas can be reduced. Furthermore, a countermeasure against the emission of visible smoke derived from $SO_3$ remaining in the exhaust gas to the outside in the plant is prepared from the viewpoint of air pollution control. The $SO_3$ oxidation rate of the denitration catalyst can be significantly reduced by, for example, about 10% as compared with a case where a finish washing liquid containing a sulfamic acid is used.

2. Second Embodiment

2.1. Regeneration Method

A denitration catalyst regeneration method according to a second embodiment will be described using FIG. 2. The denitration catalyst regeneration method according to the present embodiment is mainly different from the first embodiment in terms of the chemical used in the chemical washing step and the finish washing liquid used in the finish washing step. The description of the same configurations as those of the first embodiment will be omitted.

In the present embodiment, the chemical used in the chemical washing step (Step S14) contains at least a fluorine compound and a first organic acid. As the fluorine compound, the above-described fluorine compound can be preferably employed. Examples of the first organic acid include a formic acid ($CH_2O_2$), a citric acid ($C_6H_8O_7$), and an oxalic acid ($C_2H_2O_4$). As the first organic acid, an oxalic acid is preferable. The amount of the oxalic acid may be, for example, in a range of 1 to 20 mass % and is preferably in a range of 5 to 15 mass % with respect to the entire chemical. The amount of the organic acid is preferably added so that the pH value of the chemical is in a range of pH 1 to 6, and more preferably in a range of pH 1 to 3.

The chemical preferably contains a surfactant, and more preferably a fluorine compound, an organic acid, and a surfactant. As the surfactant, the above-described surfactant can be preferably employed. As the amount of the surfactant, the above-described amount can be preferably employed.

In the present embodiment, the finish washing liquid used in the finish washing step (Step S16) contains at least a first inorganic acid. Examples of the first inorganic acid include water ($H_2O$), a sulfamic acid ($H_3NSO_3$), and a mixed liquid thereof. The first inorganic acid preferably contains at least a sulfamic acid. As the finish washing liquid, a mixed liquid of water and one or more types of first inorganic acids (hereinafter, also referred to as inorganic acid-containing water) is preferable, and a mixed liquid of water and a sulfamic acid (hereinafter, also referred to as sulfamic acid-containing water) is more preferable. The amount of the first inorganic acid may be, for example, in a range of 0.5 to 5 mol/l with respect to the water.

According to the present embodiment, regarding the used denitration catalyst with reduced denitration performance and an increased $SO_2$ oxidation rate, the denitration performance can be recovered, and the $SO_2$ oxidation rate can be significantly reduced. For example, the $SO_2$ oxidation rate can be significantly reduced by about 20% as compared with a case where a chemical containing a sulfamic acid is used.

3. Third Embodiment

3.1. Regeneration Method

A denitration catalyst regeneration method according to a third embodiment will be described using FIG. 2. The denitration catalyst regeneration method according to the present embodiment is mainly different from the second embodiment in terms of the chemical used in the chemical washing step. The description of the same configurations as those of the second embodiment will be omitted.

In the present embodiment, the chemical used in the chemical washing step (Step S14) contains at least a fluorine compound, a first organic acid, and a second inorganic acid. As the fluorine compound and the second inorganic acid, the fluorine compound and the inorganic acid of the first embodiment can be preferably employed. Furthermore, as the first organic acid, the first organic acid of the second embodiment can be preferably employed.

4. Fourth Embodiment

4.1. Regeneration System

Figure 3:
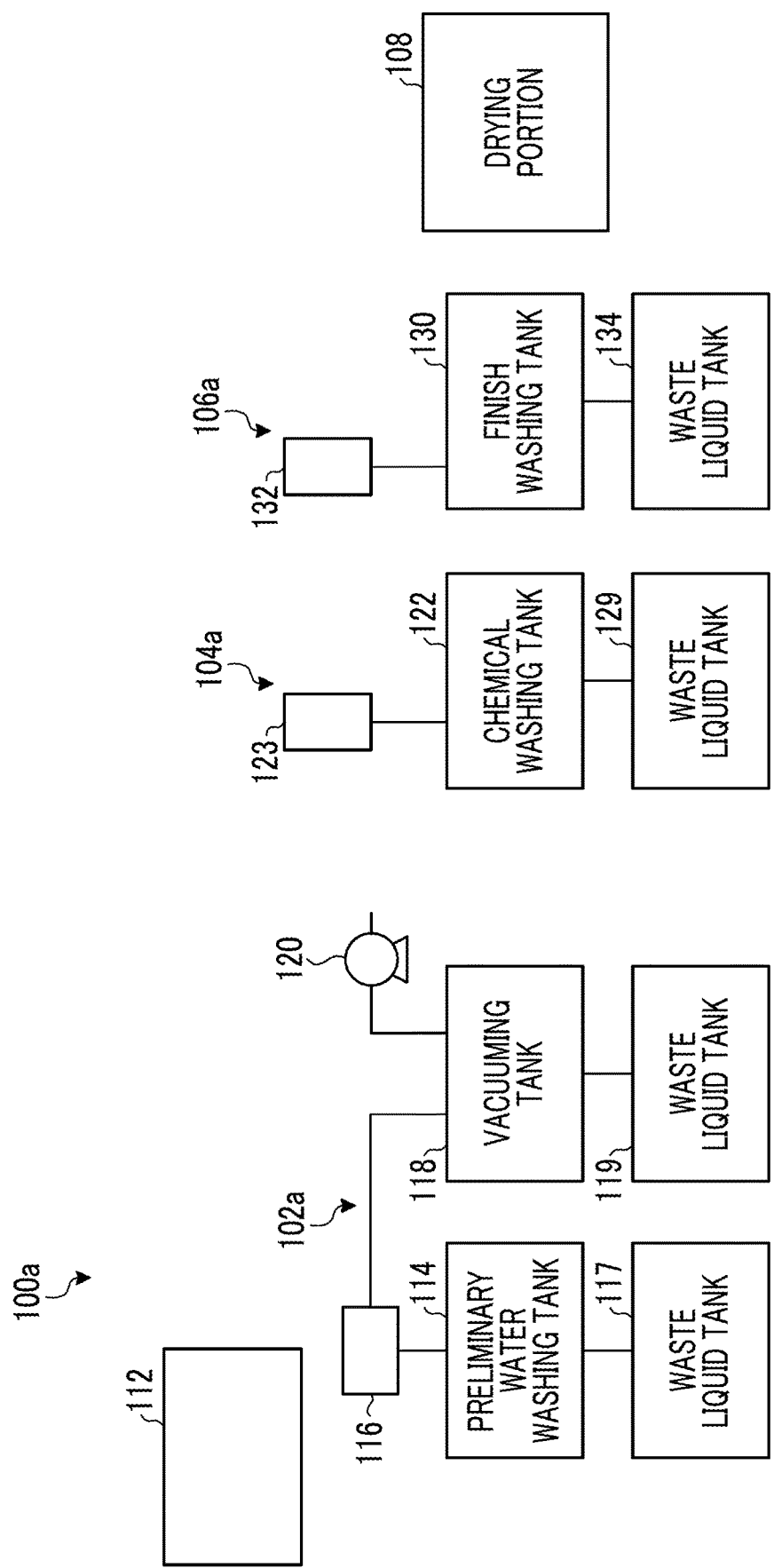
FIG. 3 is a schematic diagram showing a schematic configuration of a denitration catalyst regeneration system according to a fourth embodiment.

FIG. 3 shows a schematic configuration of a denitration catalyst regeneration system according to a fourth embodiment. A denitration catalyst regeneration system 100a shown in FIG. 3 can be combined with the denitration catalyst regeneration system 100 or other embodiments of the present disclosure.

As shown in FIG. 3, the denitration catalyst regeneration system 100a includes a pre-washing portion 102a, a chemical washing portion 104a, a finish washing portion 106a, a drying portion 108, and a catalyst carrying device 112. The catalyst carrying device 112 is a device which takes a denitration catalyst out of the denitration facility having the denitration catalyst installed therein and carries the taken denitration catalyst. The catalyst carrying device 112 may include a crane, a vehicle, a human-powered carriage, or the like which carries the catalyst.

The pre-washing portion 102a includes a preliminary water washing tank 114, a water supply device 116, a waste liquid tank 117, a vacuuming tank 118, a waste liquid tank 119, and a vacuum pump 120. The preliminary water washing tank 114 is a container which is larger than the denitration catalyst to be regenerated and can store water. The water supply device 116 has a tank which stores water, a valve which controls the supply of water, and the like, and is configured to supply the water to be used for pre-washing and vacuuming to the preliminary water washing tank 114 and the vacuuming tank 118, respectively. The waste liquid tank 117 is a container which stores the water discharged from the preliminary water washing tank 114. The vacuuming tank 118 is a container which is larger than the denitration catalyst to be regenerated and can store water. The vacuuming tank 118 has a lid or the like to allow the denitration catalyst to take in or out of the tank, and is configured so that the inside can be in a sealed state. The waste liquid tank 119 is a container which stores the water discharged from the vacuuming tank 118. The vacuum pump 120 is configured to suck the air inside the vacuuming tank 118. The pre-washing portion 102a may have a configuration in which the preliminary water washing tank 114 and the vacuuming tank 118 are combined into one tank, or the waste liquid tank 117 and the waste liquid tank 119 are combined into one tank.

The chemical washing portion 104a includes a chemical washing tank 122, a chemical supply device 123, and a waste liquid tank 129. The chemical washing tank 122 is a container which is larger than the denitration catalyst to be regenerated and can store a chemical. The chemical supply device 123 has a tank which stores a chemical, a valve which controls the supply of the chemical, and the like, and is configured to supply the chemical to be used for chemical washing to the chemical washing tank 122. The waste liquid tank 129 is a container which stores the chemical discharged from the chemical washing tank 122.

The finish washing portion 106a includes a finish washing tank 130, a supply device 132, and a waste liquid tank 134. The finish washing tank 130 is a container which is larger than the denitration catalyst to be regenerated and can store a finish washing liquid. The supply device 132 has a tank which stores a finish washing liquid in the present disclosure, a valve which controls the supply of the finish washing liquid, and the like, and is configured to supply the finish washing liquid to the finish washing tank 130. The waste liquid tank 134 is a container which stores the finish washing liquid discharged from the finish washing tank 130.

The drying portion 108 can preferably employ the same configuration as the drying portion 108 of the denitration catalyst regeneration system 100.

The pre-washing portion can optionally further include a jet water washing tank (not shown) for performing jet water washing. The jet water washing tank includes at least a water tank for washing the denitration catalyst and a water supply device, and is configured to spray high-pressure water assisted by compressed air so as to supply the washing water to the gas vent holes of the denitration catalyst. The jet water washing tank may have a configuration in which the water supply device or the waste liquid tank is shared as in the case of the preliminary water washing tank and the vacuuming tank.

4.2. Regeneration Method

Figure 4:
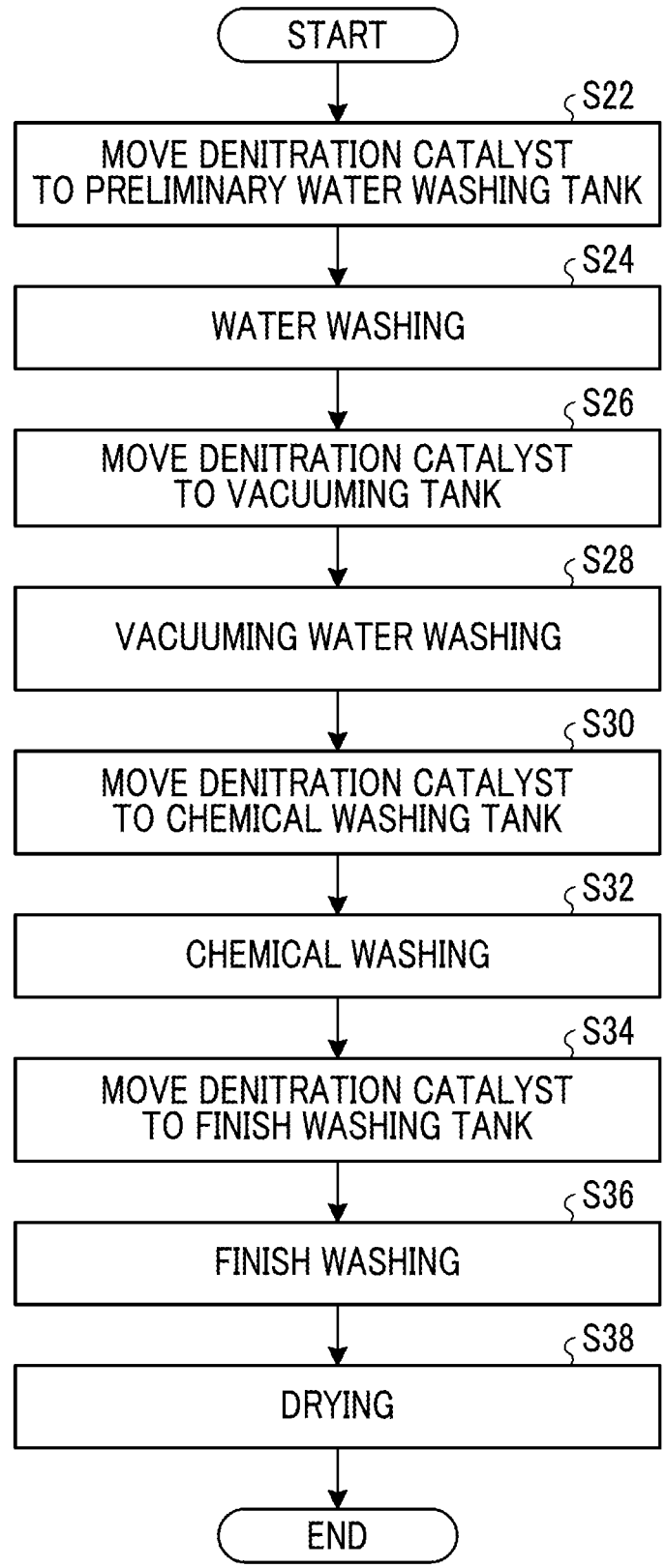
FIG. 4 is a flowchart showing an example of a denitration catalyst regeneration method according to the fourth embodiment.

FIG. 4 shows a flowchart showing an example of a denitration catalyst regeneration method according to the fourth embodiment. The denitration catalyst regeneration method shown in FIG. 4 can be realized by executing the treatment in each portion of the denitration catalyst regeneration system 100a. The denitration catalyst regeneration method according to the present embodiment is mainly different from the first to third embodiments in that it further includes a pre-washing step.

As shown in FIG. 4, in the pre-washing step, in the denitration catalyst regeneration system 100a, the denitration catalyst is taken out of the denitration facility and moved to the preliminary water washing tank 114 by the catalyst carrying device 112 (Step S22). Next, the denitration catalyst is water-washed in the preliminary water washing tank 114 (Step S24). This treatment may be executed by carrying the denitration catalyst to the empty preliminary water washing tank 114 and then supplying the water to the preliminary water washing tank 114 by the water supply device 116, or by supplying the water to the preliminary water washing tank 114 by the water supply device 116 and putting the denitration catalyst into the preliminary water washing tank 114 in which the water is stored.

The denitration catalyst after the water washing is moved to the vacuuming tank 118 by the catalyst carrying device 112 (Step S26). In a case where the denitration catalyst is moved to the vacuuming tank 118, the vacuum pump 120 sucks the air inside the vacuuming tank 118 to prepare a vacuum state (Step S28). In this treatment, in a case where foreign substances clog the inside of the denitration catalyst by preparing a vacuum state inside the vacuuming tank 118, the foreign substances can be sucked. The vacuuming water washing can be performed by reducing the air pressure in the vacuuming tank 118 to, for example, −600 mmHg or less. In a case where a vacuum state is prepared inside the vacuuming tank 118, the vacuuming tank 118 is opened to the atmospheric pressure, and the catalyst carrying device 112 moves the denitration catalyst from the vacuuming tank 118 to the chemical washing tank 122 (Step S30).

In addition, the pre-washing step can further include jet washing after the vacuuming water washing and before the chemical washing step. In the jet washing, washing water is supplied to the gas passing holes by spraying high-pressure water assisted by compressed air in a jet water washing tank (not shown). Accordingly, foreign substances remaining mainly inside the denitration catalyst can be reliably removed.

As the chemical washing step, the denitration catalyst is moved to the chemical washing tank 122 (Step S30). After the denitration catalyst is moved to the chemical washing tank 122, the denitration catalyst is immersed in the chemical in the chemical washing tank 122 (Step S32). The denitration catalyst may be moved to the chemical washing tank 122, and then the chemical may be supplied into the chemical washing tank 122 to immerse the denitration catalyst disposed in the chemical washing tank 122 in the chemical. Otherwise, the denitration catalyst may be moved to the chemical washing tank 122 storing the chemical to immerse the denitration catalyst disposed in the chemical washing tank 122 in the chemical.

As the finish washing step, in the denitration catalyst regeneration system 100a, in a case where the denitration catalyst is immersed in the chemical, the denitration catalyst is moved from the chemical washing tank 122 to the finish washing tank 130 by the catalyst carrying device 112 (Step S34). In the denitration catalyst regeneration system 100a, in a case where the denitration catalyst is moved to the finish washing tank 130, the denitration catalyst is washed (finish washing is performed) in the finish washing tank 130 (Step S36). Specifically, the finish washing liquid is supplied from the supply device 132 into the finish washing tank 130, and the denitration catalyst is washed with the finish washing liquid. The finish washing treatment may be executed while the finish washing liquid in the finish washing tank 130 is discharged, or may be executed by storing the finish washing liquid in the finish washing tank 130.

Next, in a case where the finish washing of the denitration catalyst is performed, the denitration catalyst is moved to the drying portion 108 and dried in the drying portion 108 (Step S38).

According to the present embodiment, the chemical and/or the finish washing liquid can be efficiently used by repeatedly using the chemical and/or the finish washing liquid in the denitration catalyst regeneration system 100a. Since the $SO_2$ oxidation rate can be reduced by the chemical and/or the finish washing liquid, a low $SO_2$ oxidation rate can be maintained even in a case where the chemical and the finish washing liquid are used multiple times. In a case where the chemical is repeatedly used, even after the denitration catalyst is immersed in the chemical in the chemical washing tank 122, and then taken out of the chemical washing tank 122, the chemical in which the denitration catalyst is immersed is not discharged to the waste liquid tank 129 and stored in the chemical washing tank 122. Then, the next denitration catalyst is moved to the chemical washing tank 122 in which the chemical is stored. Accordingly, the chemical can be repeatedly used. In addition, the components of the chemical may be adjusted in a case where the chemical is used for the second time or more, that is, in a case where the denitration catalyst is immersed for the second time or more. Furthermore, as alternative means, the chemical washing tank 122 may be provided with a tank which temporarily stores the chemical and a circulation mechanism which circulates the chemical, and once the chemical is discharged from the chemical washing tank 122 to the tank, the chemical may be put into the chemical washing tank 122 again from the tank by the circulation mechanism when being used. In addition, in this case, the circulation mechanism may be provided with a filter or the like to remove foreign substances in the chemical, or may be provided with a concentration meter and/or a pH meter to add the chemical or the chemical component according to the concentration and/or the pH value of the chemical. In addition, in a case where the finish washing liquid is repeatedly used, the finish washing liquid can be repeatedly used by employing the same configuration and method as in the case of the above-described chemical.

According to the present embodiment, in a case where organic acid-containing water or inorganic acid-containing water, particularly, oxalic acid-containing water or sulfamic acid-containing water is used as the finish washing liquid, the recovery rate of the catalyst performance during the regeneration treatment can be further increased. Furthermore, in a case where water is used as the finish washing liquid, the water can also be efficiently used by repeatedly using the water used for pre-washing and finish washing. By efficiently using the water, the amount of waste liquid can be reduced. For example, even after the water-washed denitration catalyst is taken out of the preliminary water washing tank 114, the vacuuming tank 118, and the finish washing tank 130, the state in which the water is stored in the preliminary water washing tank 114, the vacuuming tank 118, and the finish washing tank 130 may be maintained, and then the next denitration catalyst may be moved and water-washed.

In the above-described embodiment, a regeneration system having a configuration in which separate tanks are provided as tanks performing preliminary water washing, vacuuming water washing, chemical washing, finish washing, and optional jet water washing treatments, respectively, has been exemplified. The present invention is not limited thereto. One tank in which the respective steps related to the denitration catalyst regeneration method can be performed may be provided. For example, a configuration in which the preliminary water washing tank, the vacuuming tank, and the finish washing tank are combined into one tank, or a configuration in which one tank is provided as a waste liquid tank for the above tanks may be employed. In addition, for example, the pre-washing portion may have a configuration in which the preliminary water washing tank, the vacuuming tank, and the jet water washing tank are combined into one tank, or a configuration in which one tank is provided as a waste liquid tank for the above tanks.

In the above-described embodiment, a regeneration system and a regeneration method in which the denitration catalyst is taken out of the denitration facility and treated have been exemplified. The present invention is not limited thereto. The denitration catalyst may be regenerated in a state in which the denitration catalyst is installed in the denitration facility. In this case, water, a chemical, and/or a finish washing liquid are supplied to the denitration facility, and waste liquid is recovered from the denitration facility.

The denitration catalyst regeneration system according to the above-described embodiment may further include a temperature adjusting mechanism for adjusting the temperature of the chemical and/or the finish washing liquid. By providing the temperature adjusting mechanism, the temperature during the chemical washing and/or the finish washing treatment can be controlled. The treatment temperature during the impregnation with the denitration catalyst can be maintained at room temperature by the temperature adjusting mechanism, or can be made higher than room temperature.

Examples

Hereinafter, the present invention will be described in greater detail with examples. The denitration catalyst regeneration method and the denitration catalyst regeneration system according to the present invention are not limited to the following examples.

1. Evaluation of Catalyst Regeneration

At the laboratory scale, the denitration catalyst regeneration method was performed for denitration catalysts with different chemicals and finish washing liquids, and a denitration rate, a denitration K value, a denitration recovery rate (denitration performance after regeneration treatment/denitration performance when the denitration catalyst is new: K/K0), and an $SO_2$ oxidation rate were evaluated in each case. The reaction rate constant of the catalyst was used as an index of the denitration performance. Regarding the denitration catalysts, denitration catalysts after a denitration treatment for 50,000 hours in an actual power plant were provided as test samples. The denitration catalyst was a honeycomb catalyst mainly containing a titanium dioxide ($TiO_2$) on which a vanadium pentoxide ($V_2O_5$) and a tungsten oxide ($WO_3$) were supported. For comparison, a new denitration catalyst was also evaluated.

1.1. Chemicals

In Example 1, a chemical prepared so that ammonium hydrogen fluoride was mixed at a ratio of 1 mass % of hydrogen fluoride, a sulfamic acid was mixed at a ratio of 0.33 mol/l as an inorganic acid, and a polyoxyethylene polyoxypropylene glycol was mixed at a ratio of 0.05 mass % as a surfactant was used. In Example 2, a chemical prepared so that ammonium hydrogen fluoride was mixed at a ratio of 1 mass % of hydrogen fluoride, an oxalic acid was mixed at a ratio of 10.8 mass %, and a polyoxyethylene polyoxypropylene glycol was mixed at a ratio of 0.05 mass % as a surfactant was used. In Comparative Example 1, the same chemical as in Example 1 was used.

1.2. Finish Washing Liquid

In Example 1, a finish washing liquid prepared so that a sulfamic acid was contained at 1 mol/l was used. In Example 2, a finish washing liquid prepared so that an oxalic acid was contained at a ratio of 5.4 mass % was used. In Comparative Example 1, the same finish washing liquid as in Example 1 was used.

1.3. Catalyst Regeneration Treatment and Measurement of Catalyst Performance

The catalyst regeneration treatment was performed on the catalyst of each example. In addition, the catalyst performance of each catalyst was measured using a tube-type flow reaction inspection device under evaluation conditions shown in the following Table 1.

TABLE 1

| Evaluation Conditions | | |
| --- | --- | --- |
| Item | Unit | Value |
| Temperature | ° C. | 380 |
| Gas Flow Rate | NL/hr | 220 |
| AV | $Nm^3/m^2/hr$ | 22 |
| Ugs | Nm/s | 0.24 |
| NO | ppmvd | 218 |
| $SO_x$ | ppmvd | 1076 |
| $O_2$ | % vd | 2.8 |
| $NH_3$ | ppmvd | 218 |
| Ratio of $NH_3/NO_x$ | mol/mol | 1 |
| $H_2O$ | % vw | 9.1 |
| $CO_2$ | % vd | 12 |
| $N_2$ | — | balance |
| Form of Added Catalyst | — | 2 cells × 2 cells × 100 mm length |
| Gas Source | — | gas cylinder |

First, a denitration rate and an $SO_2$ oxidation rate of the catalyst were measured, and a reaction rate constant K (denitration K value) and a denitration performance recovery rate (denitration performance after regeneration treatment/denitration performance when the denitration catalyst is new: K/K0) were obtained. Next, each catalyst with reduced catalyst performance due to the denitration treatment was washed using the chemical and the finish washing liquid of each example. In the washing treatment, each catalyst was pre-washed for 3 minutes, and then subjected to chemical washing by being immersed in the chemical for 60 minutes. Each catalyst after the chemical washing was subjected to finish washing by being immersed in the finish washing liquid for 30 minutes at room temperature. After the finish washing, the catalyst was dried all night at 110° C. For each dried catalyst after the regeneration treatment, a denitration rate and an $SO_2$ oxidation rate were measured again, and a reaction rate constant K (denitration K value) and a denitration performance recovery rate (denitration performance after regeneration treatment/denitration performance when the denitration catalyst is new: K/K0) were obtained. The results are shown in the following Table 2.

TABLE 2

| Results of Washing Treatment | | | |
| --- | --- | --- | --- |
| | Washing State | K/K0 (—) | $SO_2$ Oxidation Rate (—) |
| New Product | — | 1.00 | — |
| Comparative Example 1 | Before washing | 0.29 | 1.00 |
| | After washing | 1.01 | 0.64 |
| Example 1 | Before washing | 0.35 | 1.00 |
| | After washing | 1.00 | 0.55 |
| Example 2 | Before washing | 0.34 | 1.00 |
| | After washing | 0.98 | 0.44 |

Regarding the reduction of the $SO_2$ oxidation rate, the $SO_2$ oxidation rate of Example 1 was reduced by about 10% and the $SO_2$ oxidation rate of Example 2 was reduced by about 20% as compared with Comparative Example 1. Regarding the denitration performance, in Examples 1 and 2, the denitration performance recovery rate was in a range of 0.98 to 1.00, and it was possible to recover the denitration performance.

INDUSTRIAL APPLICABILITY

With a denitration catalyst regeneration method and a denitration catalyst regeneration system according to the present invention, it is possible to recover catalyst performance to a high level and reduce an $SO_2$ oxidation rate of a catalyst.

REFERENCE SIGNS LIST 100, 100a: DENITRATION CATALYST REGENERATION SYSTEM
104, 104a: CHEMICAL WASHING PORTION
106, 106a: FINISH WASHING PORTION
108, 108a: DRYING PORTION
112: CATALYST CARRYING DEVICE
114: PRELIMINARY WATER WASHING TANK
116: WATER SUPPLY DEVICE
118: VACUUMING TANK
120: VACUUM PUMP
122: CHEMICAL WASHING TANK
130: FINISH WASHING TANK

The invention claimed is:

1. A denitration catalyst regeneration method comprising:
   a chemical washing step of immersing a denitration catalyst in a chemical containing a fluorine compound and an inorganic acid;
   a step of taking the denitration catalyst out of the chemical; and
   a finish washing step of washing the denitration catalyst taken out of the chemical with a finish washing liquid containing an organic acid.

2. The denitration catalyst regeneration method according to claim 1,
   wherein the chemical further contains a surfactant, and the surfactant is a nonionic surfactant or an anionic surfactant.

3. The denitration catalyst regeneration method according to claim 2, wherein the nonionic surfactant is a surfactant mainly containing a polyoxyethylene polyoxypropylene glycol, a polyoxyethylene derivative, or a polyalkylene glycol derivative.

4. The denitration catalyst regeneration method according to claim 2,
wherein the anionic surfactant is a surfactant mainly containing a polyoxyalkylene alkyl ether phosphoric acid ester.

5. The denitration catalyst regeneration method according to claim 1,
wherein the inorganic acid includes a sulfamic acid.

6. The denitration catalyst regeneration method according to claim 5,
wherein the inorganic acid further includes a hydrochloric acid, or further includes a hydrochloric acid and a boric acid.

7. The denitration catalyst regeneration method according to claim 1,
wherein the organic acid includes at least an oxalic acid, and the finish washing liquid is organic acid-containing water containing one or more types of organic acids.

8. The denitration catalyst regeneration method according to claim 1, further comprising a pre-washing step of water-washing the denitration catalyst before the chemical washing step.

9. A denitration catalyst regeneration method comprising:
a chemical washing step of immersing a denitration catalyst in a chemical containing a fluorine compound and a first organic acid;
a step of taking the denitration catalyst out of the chemical; and
a finish washing step of washing the denitration catalyst taken out of the chemical with a finish washing liquid containing a first inorganic acid.

10. The denitration catalyst regeneration method according to claim 9,
wherein the chemical further contains a surfactant, and the surfactant is a nonionic surfactant or an anionic surfactant.

11. The denitration catalyst regeneration method according to claim 10,
wherein the nonionic surfactant is a surfactant mainly containing a polyoxyethylene polyoxypropylene glycol, a polyoxyethylene derivative, or a polyalkylene glycol derivative.

12. The denitration catalyst regeneration method according to claim 10,
wherein the anionic surfactant is a surfactant mainly containing a polyoxyalkylene alkyl ether phosphoric acid ester.

13. The denitration catalyst regeneration method according to claim 9,
wherein the first organic acid includes an oxalic acid.

14. The denitration catalyst regeneration method according to claim 9,
wherein the first inorganic acid includes at least a sulfamic acid, and the finish washing liquid is inorganic acid-containing water containing one or more types of inorganic acids.

15. The denitration catalyst regeneration method according to claim 9,
wherein the chemical further contains a second inorganic acid.

16. The denitration catalyst regeneration method according to claim 15,
wherein the second inorganic acid includes a sulfamic acid.

17. The denitration catalyst regeneration method according to claim 16,
wherein the second inorganic acid further includes a hydrochloric acid, or further includes a hydrochloric acid and a boric acid.

18. The denitration catalyst regeneration method according to claim 9, further comprising a pre-washing step of water-washing the denitration catalyst before the chemical washing step.

19. A denitration catalyst regeneration system comprising:
a chemical washing portion which immerses a denitration catalyst in a chemical containing a fluorine compound and an inorganic acid; and
a finish washing portion which subjects the denitration catalyst taken out of the chemical to finish washing with a finish washing liquid containing an organic acid.

20. The denitration catalyst regeneration system according to claim 19,
wherein the chemical washing portion is configured to perform immersion in a chemical containing a sulfamic acid as the inorganic acid.

21. The denitration catalyst regeneration system according to claim 20,
wherein the chemical washing portion is configured to perform immersion in a chemical further containing a hydrochloric acid, or a hydrochloric acid and a boric acid as the inorganic acid.

22. The denitration catalyst regeneration system according to claim 19,
wherein the finish washing portion is configured to perform finish washing with organic acid-containing water containing at least an oxalic acid as the organic acid and containing one or more types of organic acids.

23. The denitration catalyst regeneration system according to claim 19, further comprising a pre-washing portion which water-washes the denitration catalyst before the immersion in the chemical.

24. A denitration catalyst regeneration system comprising:
a chemical washing portion which immerses a denitration catalyst in a chemical containing a fluorine compound and a first organic acid; and
a finish washing portion which subjects the denitration catalyst taken out of the chemical to finish washing with a finish washing liquid containing a first inorganic acid.

25. The denitration catalyst regeneration system according to claim 24,
wherein the chemical washing portion is configured to perform immersion in a chemical containing an oxalic acid as the first organic acid.

26. The denitration catalyst regeneration system according to claim 24,
wherein the finish washing portion is configured to perform finish washing with inorganic acid-containing water containing at least a sulfamic acid as the first inorganic acid and containing one or more types of inorganic acids.

27. The denitration catalyst regeneration system according to claim 24,
wherein the chemical washing portion is configured to perform immersion in a chemical further containing a second inorganic acid.

28. The denitration catalyst regeneration system according to claim 27, wherein the chemical washing portion is configured to perform immersion in a chemical containing a sulfamic acid as the second inorganic acid.

29. The denitration catalyst regeneration system according to claim 28,
wherein the chemical washing portion is configured to perform immersion in a chemical further containing a hydrochloric acid, or a hydrochloric acid and a boric acid as the second inorganic acid.

30. The denitration catalyst regeneration system according to claim 24, further comprising a pre-washing portion which water-washes the denitration catalyst before the immersion in the chemical.

* * * * *